United States Patent
Erez et al.

(10) Patent No.: US 10,834,130 B2
(45) Date of Patent: Nov. 10, 2020

(54) DETECTION OF MALICIOUS ATTEMPTS TO ACCESS A DECOY DATABASE OBJECT BASED ON CONNECTION TYPE

(71) Applicant: Imperva, Inc., Redwood City, CA (US)

(72) Inventors: Elad Erez, Redwood City, CA (US); Amichai Shulman, Tel Aviv (IL)

(73) Assignee: Imperva, Inc., San Mateo, CA (US)

( * ) Notice: Subject to any disclaimer, the term of this patent is extended or adjusted under 35 U.S.C. 154(b) by 172 days.

(21) Appl. No.: 15/924,156

(22) Filed: Mar. 16, 2018

(65) Prior Publication Data

US 2019/0289034 A1   Sep. 19, 2019

(51) Int. Cl.
*H04L 29/06* (2006.01)
*G06F 21/62* (2013.01)
*G06F 16/27* (2019.01)
*G06F 16/9535* (2019.01)

(52) U.S. Cl.
CPC .......... *H04L 63/1491* (2013.01); *G06F 16/27* (2019.01); *G06F 16/9535* (2019.01); *G06F 21/6218* (2013.01)

(58) Field of Classification Search
CPC .. H04L 63/1491; G06F 11/3438; G06F 16/27; G06F 21/00; G06F 21/55; G06F 21/6218; G06F 2201/80
See application file for complete search history.

(56) References Cited

U.S. PATENT DOCUMENTS

| | | | |
|---|---|---|---|
| 2012/0246696 A1* | 9/2012 | Boukobza | G06F 21/6245 726/1 |
| 2013/0145465 A1* | 6/2013 | Wang | G06F 21/552 726/23 |
| 2016/0381023 A1* | 12/2016 | Dulce | H04L 63/10 726/9 |

OTHER PUBLICATIONS

Cesar Cerrudo et al., "Hacking Databases for Owning your Data," 2007, 30 pages, Argeniss Information Security.
"DAM QuickStart (TCP/IP Sniffer with Alert Data Policy)," Jul. 11, 2013, 3 pages, Fortinet Inc., downloaded from http://help.fortinet.com/fdb/5-0-0/html/source/tasks/t_quickstart_dam_sniffer.html on Oct. 16, 2017.
"Data Masking," 2018, 5 pages, Imperva, downloaded from https://www.imperva.com/data-security/data-security-101/data-masking/.

(Continued)

*Primary Examiner* — Ellen Tran
(74) *Attorney, Agent, or Firm* — Nicholson De Vos Webster & Elliott LLP

(57) ABSTRACT

A method by a security system for detecting malicious attempts to access a decoy database object in a database. The database includes database objects accessible by clients of the database called database clients. The method includes detecting access to a decoy database object of the database is being attempted by a database client over a connection to the database, where the decoy database object is a database object that is created for the purpose of deceiving an attacker as opposed to being a legitimate database object, determining that the connection is of an application connection type, where the application connection type is a type of connection over which queries generated by a database client are submitted, and responsive to the determination that the connection is of the application connection type, causing an alert to be generated.

17 Claims, 8 Drawing Sheets

(56) References Cited

OTHER PUBLICATIONS

John Magnabosco, "Honeycombing a Database," Sep. 16, 2009, 16 pages, downloaded from https://www.red-gate.com/simple-talk/sql/database-administration/honeycombing-a-database/ on Oct. 14, 2017.
"Honeypots in the Database," Nov. 23, 2007, 3 pages, Redgate, downloaded from http://www.sqlservercentral.com/blogs/brian_kelley/2007/11/23/honeypots-in-the-database/ on Oct. 9, 2017.
Lance Spitzner, "Honeypots: Tracking Hackers," Sep. 13, 2002, 405 pages, Addison Wesley.
Piotr Motloch, "Imperva Breach Prevention, Protect enterprise data from insider threats," Oct. 2016, 30 pages, Imperva, Inc.
"LogRhythm Labs Embedded Expertise—Security Analytics Suite—Honeypot," 2014, 2 pages, LogRhythm Inc.
Carrie McDaniel, "The Inside Scoop on Imperva CounterBreach Findings," Nov. 17, 2015, 5 pages, Imperva, downloaded from https://www.imperva.com/blog/2015/11/the-inside-scoop-on-counterbreach-findings/ on Oct. 21, 2017.
"Database activity monitoring," Sep. 10, 2017, 4 pages, Wikipedia, downloaded from https://en.wikipedia.org/wiki/Database_activity_monitoring on Oct. 16, 2017.
"Imperva CounterBreach, Datasheet," 2017, 6 pages, Imperva, Inc.
"Database Security, Audit and Protect Critical Databases, Datasheet" 2014, 4 pages, Imperva.
John Magnabosco, "Protecting SQL Server Data," 2009, 232 pages.

\* cited by examiner

DETECTION OF MALICIOUS ATTEMPTS TO ACCESS A DECOY DATABASE OBJECT BASED ON CONNECTION TYPE

FIELD

Embodiments of the invention relate to the field of database security, and more specifically, to detecting malicious attempts to access a decoy database object based on connection type.

BACKGROUND

Database servers are computer programs that provide database services to other computer programs, which are typically running on other electronic devices and adhering to the client-server model of communication. Many web applications utilize database servers (e.g., relational databases to store information received from Hypertext Transfer Protocol (HTTP) clients and/or information to be displayed to HTTP clients. However, other non-web applications may also utilize database servers, including but not limited to accounting software, other business software, or research software. Further, some applications allow for users to perform ad-hoc or defined queries (often using Structured Query Language (SQL)) using the database server. Database servers typically store data using one or more databases. Thus, in some instances a database server can receive a SQL query from a client (directly from a database client process or client end station using a database protocol, or indirectly via a web application server that a web server client is interacting with), execute the SQL query using data stored in the set of one or more database objects of one or more of the databases, and may potentially return a result (e.g., an indication of success, a value, one or more tuples, etc.).

Databases may be implemented according to a variety of different database models, such as relational (such as PostgreSQL, MySQL, and certain Oracle product), non-relational, graph, columnar (also known as extensible record; e.g., HBase), object, tabular, tuple store, and multi-model. Examples of non-relational database models (which are also referred to as schema-less and NoSQL) include key-value store and document store (also known as document-oriented as they store document-oriented information, which is also known as semi-structured data). A database may comprise one or more database objects that are managed by a Database Management System (DBMS), each database object may include a number of records, and each record may comprise of a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (custom database object). In a cloud database (a database that runs on a cloud platform and that is provided as a database service), identifiers are used instead of database keys, and relationships are used instead of foreign keys. In the case of relational databases, each database typically includes one or more database tables (traditionally and formally referred to as "relations"), which are ledger-style (or spreadsheet-style) data structures including columns (often deemed "attributes", or "attribute names") and rows (often deemed "tuples") of data ("values" or "attribute values") adhering to any defined data types for each column.

The term honeypot is commonly used to refer to a trap set to detect, deflect, or counteract attempts at an unauthorized use or malicious use of information systems. Generally, a honeypot can be a decoy server or end station that appears to be part of a network, but is actually isolated and monitored, and which appears to contain information or a resource of value to attackers. Honeypots allow system operators to learn how attackers probe and attempt to gain access to end stations, and can also be used to gather evidence to be used to assist in the apprehension or prosecution of attackers.

The concept of honeypots can also be used in a database context. For example, a database object (e.g., a decoy database table) can be placed in a database for the purpose of deceiving an attacker. Such a database object may be referred to as a decoy database object. This decoy database object can be populated with fake but alluring data to attract the attention of an attacker. Any accesses to the decoy database object are considered to be suspicious because legitimate users/applications are not expected to access the decoy database object. The decoy database object can be monitored for accesses (e.g., by auditing the database object) and an alert can be generated (e.g., to notify an administrator) when accesses to the decoy database object are detected.

As mentioned above, any accesses to a decoy database object are considered to be suspicious. However, not all accesses to a decoy database object are malicious. For example, a database administrator might access a decoy database object as part of performing maintenance on the database or another non-malicious user may accidentally access the decoy database object (e.g., due to a typo when forming a query). Thus, generating an alert whenever the decoy database object is accessed can potentially generate false positives. When there are a significant number of false positives (relative to the number of true positives), it can render the alerts less meaningful and increases the likelihood that the alerts, even for true positives, will be ignored, thus potentially compromising the security of the database.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
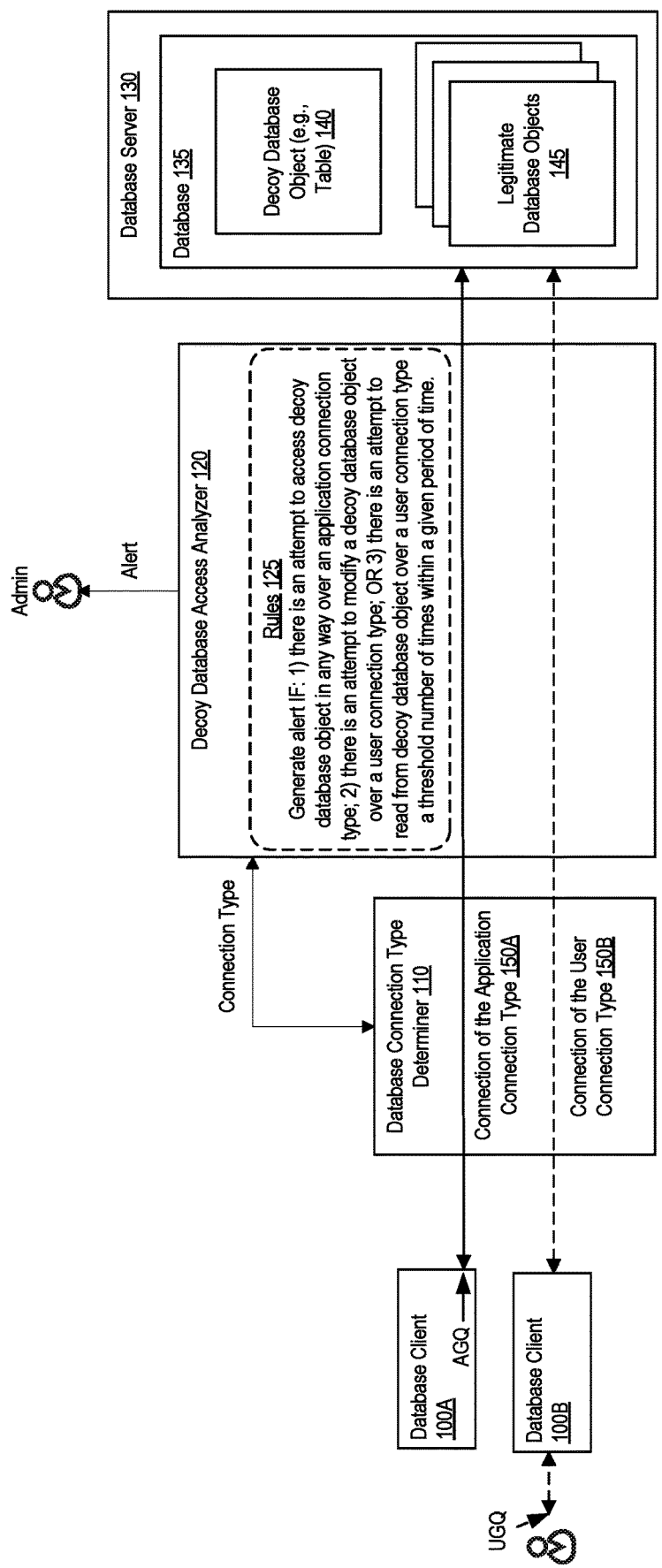
FIG. 1 is a block diagram illustrating components of a system for detecting malicious attempts to access a decoy database object, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) is one type of "Uniform Resource Identifier" (URI), these terms may be used interchangeably herein to refer to a URI, which is a string of characters used to identify a resource.

Various embodiments are described herein for detecting malicious attempts to access a decoy database object based on connection type. While embodiments may use one or more databases implemented according to one or more of the different database models previously described, a relational database with tables is sometimes described to simplify understanding. In the context of a relational database, each relational database table (which is a type of database object) generally contains one or more data categories logically arranged as columns according to a schema, where the columns of the relational database table are different ones of the fields from the plurality of records, and where each row of the relational database table are different ones of a plurality records and contains an instance of data for each category defined by the fields. Thus, the fields of a record are defined by the structure of the database object to which it belongs.

FIG. 1 is a block diagram illustrating components of a system for detecting malicious attempts to access a decoy database object, according to some embodiments.

As shown in the diagram, the system includes database clients 100A and 100B, database connection type determiner 110, decoy database access analyzer 120, and a database server 130. The database server 130 includes a database 135, which includes legitimate database objects 145 and a decoy database object 140. As used herein, a decoy database object 140 is a database object that is created for the purpose of deceiving an attacker, as opposed to being a legitimate database object 145 which is a database object that is created for a legitimate purpose (that is meant to be accessed by legitimate users/applications). In one embodiment, the database 135 is a production database. In an embodiment where the database 135 is a relational database, the database objects 140, 145 may take the form of database tables. While the database 135 is shown as including a single decoy database object 140, it should be understood that in other embodiments the database 135 can include more than one decoy database object 140.

As shown in the diagram, database client 100A has established connection 150A to the database 135 and database client 100B has established connection 150B to the database 135. The database clients 100 can access the database 135 over their respective database connections 150. For example, the database clients 100 may access the database 135 by submitting commands/queries to the database 135 over their respective connections 150. These commands/queries could include various commands, including commands to read one or more records from a particular database object 140, 145, modify the records of a particular database object 140, 145, and/or delete records from a particular database object 140, 145.

The database connection type determiner 110 is configured to classify a connection 150 to the database 135 as being of an application connection type or a user connection type. An application connection type is a type of connection over which submitted queries are believed to have been generated by an application (i.e., application generated queries (AGQs)), whereas a user connection type (also referred to as a non-application connection type) is a type of connection over which submitted queries are not expected to have been generated by an application (such queries are referred to as user generated queries (UGQs) or non-application generated queries). In some embodiments, the database connection type determiner 110 classifies a database connection 150 as being an application connection type or a user connection type based on analyzing information sent over the connection, such as the name of the database client 100, the driver being used by the database client 100 to connect to the database 135, the types of queries that are being submitted over the connection 150, the amount of data being sent over the connection 150, the frequency of queries being submitted over the connection 150, and/or the number of active connections established by the database client 100.

As shown in the diagram, the connection 150A has been classified to be of the application connection type, and the queries submitted over the connection 150A to the database 135 by the database client 100A are treated as application generated queries. It was found that application generated queries, since they are generated (formed) by an application (via known code/scripts that are part of an application), typically only access a set of pre-configured legitimate database objects 145, and are not expected to access a decoy database object 140. In contrast, the connection 150B has been classified to be of the user connection type, and the queries submitted over the connection 150B to the database 135 by the database client 100B are treated as user generated queries. While one, more, or all the queries submitted over a connection classified as a user connection type can in fact be similar to and/or the same as queries submitted over a connection classified as an application connection type, that is not a requirement. In fact, it may be that one, more, or all of the queries submitted over a connection classified as a user connection will be customized, ad-hoc queries that may be formed a variety of ways (e.g., a user interacting with the database client 100B to enter queries via a user interface (e.g., command line interface (CLI) or graphical user interface (GUI)) provided by the database client 100B; a script/code that is not part of an application's known script/code)).

The decoy database access analyzer 120 is configured to determine whether an attempt to access the decoy database object 140 of the database 135 is likely to be malicious according to a set of pre-configured rules 125. For example, as shown in the diagram, the rules 125 indicate that an alert is to be generated (e.g., indicating that a likely malicious attempt to access the decoy database object 140 has been detected) if: 1) there is an attempt to access a decoy database object 140 in any way (e.g., read, modify, delete etc.) over a connection 150 of the application connection type; 2) there is an attempt to modify a decoy database object 140 over a connection 150 of the user connection type; or 3) there is an attempt to read from a decoy database object 140 over a connection 150 of the user connection type in conjunction with some additional criteria (e.g., a threshold number of times within a given period of time). The decoy database access analyzer 120 may rely on the database connection type determiner 110 to determine the connection type for a given connection 150. For example, the database connection type determiner 110 may provide the connection type of a given connection 150 to the decoy database access analyzer 120 upon receiving a request from the decoy database access analyzer 120.

Thus, the decoy database access analyzer 120 will generate an alert (e.g., to an administrator) if it detects that there is an attempt to access the decoy database object 140 in any way over connection 150A. This is because it was found that database clients 100 that connect to a database 135 over a connection 150 of the application connection type (e.g., the connection 150A) are not expected to access the decoy database object 140, and an attempt to do so is highly likely to be malicious. Also, the decoy database access analyzer 120 will generate an alert if it detects that there is an attempt to modify the decoy database object 140 over connection 150B or there is an attempt to read from the decoy database object 140 over connection 150 in conjunction with the other require criteria (e.g., a threshold number of times within a given period of time). This is because it was found that database clients that connect to a database 135 over a connection 150 of the user connection type (e.g., the connection 150B) are not expected to modify the decoy database object 140 or read from the decoy database object 140 several times within a given period of time, and an attempt to do so is highly likely to be malicious (e.g., if a database client 100 attempts to read from the decoy database object 140 once, it can be considered an accident, but if the database client 100 makes multiple attempts to read from the decoy database object 140 within a short period of time, then this is highly likely to be malicious).

In one embodiment, the generated alert can cause one or more actions to occur including but not limited to blocking the attempt to access the decoy database object 140, which can be straightforwardly implemented when the decoy database access analyzer 120 is deployed inline between the database client 100 and the database server 130, transmitting an error message back toward the database client 100 that attempted to access the decoy database object 140, and/or implementing a security rule to place all future attempts by the database client 100 that attempted to access the decoy database object 140 under heightened scrutiny.

Accordingly, embodiments can determine whether an attempt to access a decoy database object is likely to be malicious or not based, at least in part, on the type of connection over which the access is being made. Embodiments reduce the number of false positives compared to conventional techniques where all accesses to a decoy database object are considered to be malicious. Having less false positives makes the alerts more meaningful and increases the likelihood that the alerts will not be ignored, which improves the security of the database. For example, if most of the alerts are for false positives, then the database administrator that receives the alerts is more likely to ignore the alerts, and may potentially miss/overlook a true positive. However, if most of the alerts are for true positives, then the database administrator is more likely to pay closer attention to any alerts that are generated.

Figure 2:
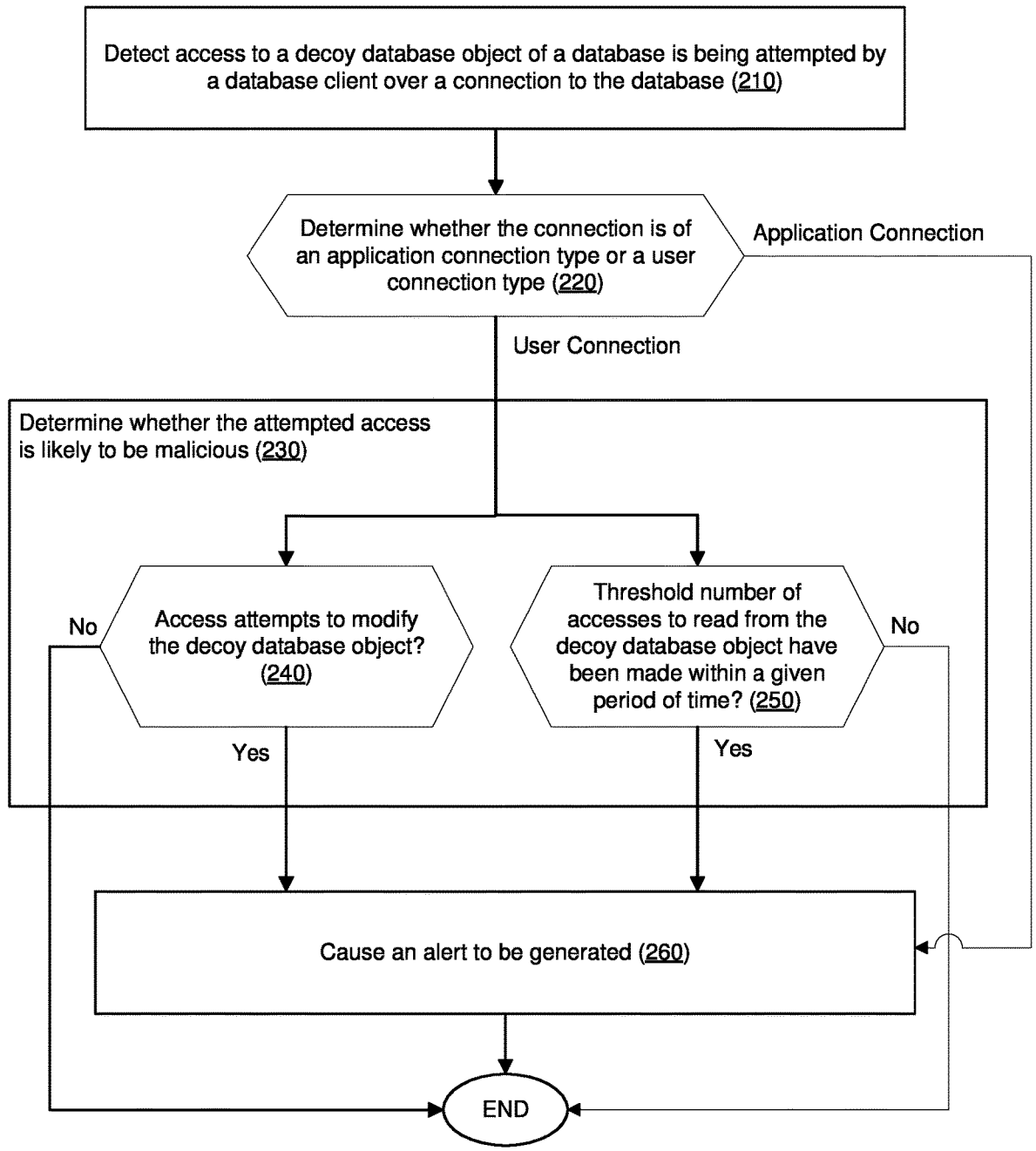
FIG. 2 is a flow diagram of a process for detecting malicious attempts to access a decoy database object, according to some embodiments.

FIG. 2 is a flow diagram of a process for detecting malicious attempts to access a decoy database object, according to some embodiments. In one embodiment, the process is performed by a decoy database access analyzer 120 (which can be implemented by a component of a security system).

In one embodiment, the process is initiated when the decoy database access analyzer 120 detects an access to a decoy database object 140 of a database 135 is being attempted by a database client 100 over a connection 150 to the database 135 (block 210). The decoy database access analyzer 120 determines whether the connection 150 is of an application connection type or a user connection type (decision block 220). The decoy database access analyzer 120 can determine whether the connection 150 is of an application connection type or a user connection type in various ways. For example, in one embodiment, decoy database access analyzer 120 can perform a lookup in a data structure that stores, for each connection 150 that the decoy database access analyzer 120 is aware of, the most recent classification provided by the database connection type determiner 110. In another embodiment, the decoy database access analyzer 120 makes a request to the database connection type determiner 110 for the current classification. If the connection 150 is determined as being of the application connection type, then the decoy database access analyzer 120 causes an alert to be generated (block 260). Returning to decision block 220, if the connection 150 is determined as being of the application connection type, then the decoy database access analyzer 120 performs further checks to determine whether the attempted access is likely to be malicious (block 230). For example, one check may be to determine whether the attempted access attempts to modify the decoy database object 140 (decision block 240). If the attempted access attempts to modify the decoy database object 140, then the decoy database access analyzer 120 causes an alert to be generated (block 260), otherwise further checks may be performed or the process may end. Another check may be to determine whether (with the attempted access) a threshold number of accesses to read from the decoy database object 140 have been made within a given period of time (decision block 250). If a threshold number of accesses to read from the decoy database object 140 have been made within a given period of time, the decoy database access analyzer 120 causes an alert to be generated (block 260), otherwise further checks may be performed or the process may end.

Figure 3A:
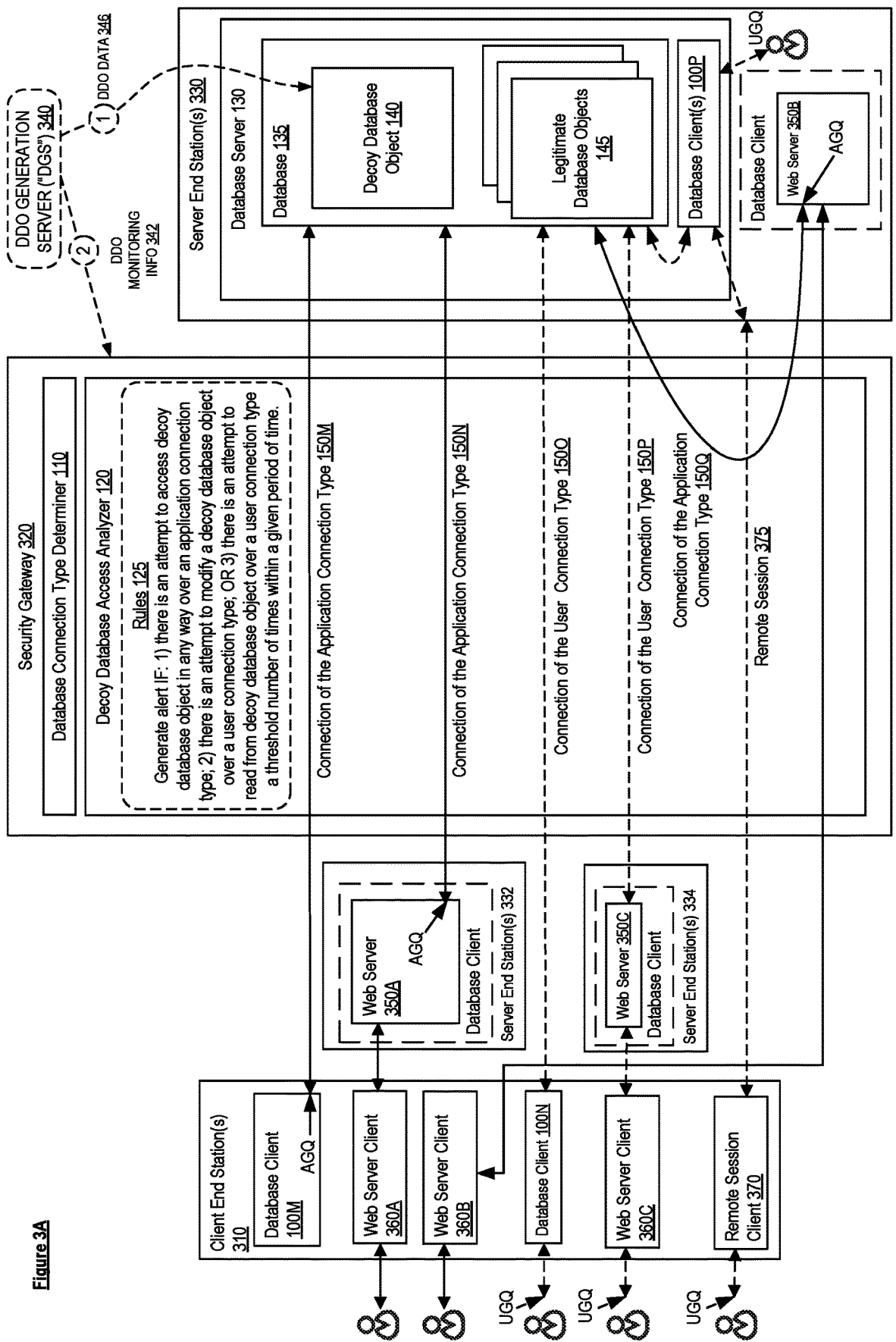
FIG. 3A is a block diagram illustrating a security gateway deployment, according to some embodiments.

FIG. 3A is a block diagram illustrating a security gateway deployment, according to some embodiments. In this deployment, the database connection type determiner 110 and the decoy database access analyzer 120 are implemented within a security gateway 320. The security gateway 320 sits "in front" of server end station(s) 330 that implement the database server 130 such that any traffic toward the server end station(s) 330 passes through the security gateway 320. For example, the security gateway 320 may be located in a "choke point" such that any attempts to access the database 135 must pass through the security gateway 320. Thus, accesses to the database server 130 or other resources of the server end station(s) 330 can be thought of as being "protected" by the security gateway 320, as most (or all) interactions with the server end station(s) 330 will pass through the security gateway 320.

In some embodiments, the security gateway 320 executes as part of a separate server end station or a network device, but in other embodiments, the security gateway 320 can operate as part of server end station(s) 330 (for example, as a software module), can be implemented in a cloud (e.g., as described later herein with regard to FIG. 3B), or can be implemented using another type of electronic device and can be software, hardware, or a combination of both.

Security gateways 320—such as firewalls, database firewalls, file system firewalls, and web application firewalls (WAFs)—are network security systems that protect software applications (e.g., web servers or database servers) executing on electronic devices (e.g., server end station(s) 330) within a network by controlling the flow of network traffic passing through the security gateway 320. By analyzing packets flowing through the security gateway 320, the security gateway 320 can prevent likely malicious traffic from reaching a protected server, modify the likely malicious traffic, and/or create an alert to trigger another responsive event or notify a user of the detection of the likely malicious traffic.

Security gateways 320 are sometimes deployed as transparent inline bridges, routers, or transparent proxies. A security gateway 320 deployed as a transparent inline bridge, transparent router, or transparent proxy is placed inline between end stations (e.g., between clients and servers) and is "transparent" to both the clients and the servers (the clients and the servers are not aware of the Internet Protocol (IP) address of the security gateway 320, and thus the security gateway 320 is not an apparent endpoint). Thus, traffic between the clients and the servers will pass through the security gateway 320 (e.g., arrive at the security gateway 320, be analyzed by the security gateway 320, and may be blocked or forwarded on to the server when the packets are deemed acceptable by the security gateway 320). Additionally, security gateways 320 can also be deployed as a reverse proxy or non-inline sniffer (which may be coupled to a switch or other network device forwarding network traffic between the clients and the servers).

As used herein, a server end station is a computing device that is operable to execute or otherwise implement one or more servers providing access to data and/or services (e.g., web server or database server). As used herein, a client end station is a computing device operable to execute or otherwise implement applications that, among other functions, can access the data and/or services provided by one or more server end stations (e.g., web server client or database client). There are a wide variety of types of client end stations, including but not limited to workstations/PCs, laptops, netbooks, mobile phones, smartphones, multimedia phones, smart watches, Voice Over Internet Protocol (VOIP) phones, user equipment (UE), terminals, portable media players, Global Positioning System (GPS) units, gaming systems, wearable computing devices, set-top boxes, etc. A web server is an application that delivers web pages (or other content) upon the request of web server clients (e.g., Hypertext Transfer Protocol (HTTP) clients such as a web browser).

As shown in the diagram, server end station(s) 330 implement the database server 130. The database server 130 includes the database 135, which includes the legitimate database objects 145 and the decoy database object 140. The database server 130 may also include a database client 100P that allows users to access database 135. The server end station(s) 330 may also implement a web server 350B, which itself is a client of the database 135.

As shown in the diagram, client end station(s) 310 may implement database client 100M and/or database client 100N, which operate as clients of the database 135. Client end station(s) 310 may also support clients (e.g., web server client 360A, web server client 360B, web server client 360C) of web servers 350, where the web servers 350 are themselves clients of the database 135 (e.g., the web servers 350A, 350C, and 350B that are respectively implemented by the server end station(s) 332, 334, and 330). Also, client end station(s) 310 may support a remote session client 370 that interacts with database client 100P.

In one embodiment, a decoy database object generation server 340 (e.g., implemented by a management server) creates the decoy database object 140 in the database 135, generates the data 346 (e.g., records) for the decoy database object 140, and populates the decoy database object 140 with the generated data 346. Also, the decoy database object generation server 340 may also generate monitoring information 342 (e.g., rules 125) for monitoring the decoy database object 140 and send them to the security gateway 320.

Database client 100M may establish a connection 150M with the database 135 and submit queries over this connection 150M. Web server client 360A may interact with web server 350A to access a web application provided by web server 350A. For example, the web server client 360A (e.g., a web browser) may send requests (e.g., HTTP requests) to the web server 350A (based on receiving a request from a user interacting with the web server client 360A) and receive responses (e.g., HTTP responses) from the web server 350A. As part of satisfying requests receives received from the web server client 360A, the web server 350A may establish a connection 150N with the database 135 and submit queries (e.g., generated by the web application) over this connection 150N. Similarly, web server client 360B may interact with web server 350B to access a web application provided by web server 350B. As part of satisfying requests received from the web server client 360B to access the web application, web server 350B may establish a connection 150Q with the database 135 with traffic over the connection 150Q configured to pass through the security gateway 320 and submit queries (e.g., generated by the web application) over this connection 150Q.

In this example, the database connection type determiner 110 classifies connections 150M, 150N, and 150Q as being of the application connection type. According to the rules configured in the decoy database access analyzer 120, an alert is to be generated if there is an attempt to access the decoy database object 140 in any way over a connection 150 of the application connection type. Thus, the decoy database access analyzer 120 causes an alert to be generated if it detects that an attempt to access the decoy database object 140 is made in any way over any one of connections 150M, 150N, and 150Q.

Database client 100N may establish a connection 150O with the database 135 and submit queries over this connection 150O. The queries may, for example, be generated by a user interacting with database client 100N via a user interface provided by database client 100N. For example, database client 100N may provide a user interface (e.g., CLI or GUI) that allows a user to enter a query, which database client 100N submits (substantially unaltered) over connection 150O. Web server client 360C may interact with web server 350C to access a web application provided by web server 350C. The web application may be an application that allows a user interacting with the web server client 360C to submit queries to the database 135. As part of satisfying requests received from web server client 360C to access the web application, web server 350C may establish a connection 150P with the database 135 and submit queries (e.g., ad-hoc queries generated by the user interacting with web server client 360C) over this connection 150P.

In this example, the database connection type determiner 110 classifies connections 150O and 150P as being of the user connection type. According to the rules configured in the decoy database access analyzer 120, an alert is to be generated if there is an attempt to modify a decoy database object 140 over a connection 150 of the user connection type or if there is an attempt to read from the decoy database object 140 over a connection 150 of the user connection type a threshold number of times within a given period of time. Thus, the decoy database access analyzer 120 causes an alert to be generated if it detects that an attempt to modify the decoy database object 140 is made over any one of connections 150O and 150P or if it detects that an attempt to read from the decoy database object 140 is made over any one of connections 150O and 150P a threshold number of times within a given period of time.

Remote session client 370 allows a user interacting with the remote session client 370 to remotely access the server end station(s) 330 via a remote session 375. The remote session 375 may be used to access database client 100P, which is installed local to the database server 130. A user interacting with the remote session client 370 can enter queries via the database client 100P, which are submitted to the database 135. A user that has physical access to the server end station(s) 330 may directly access the database client 100P and submit queries to the database client 100P without establishing a remote session. It should be noted in the above cases, since the database client 100P is local to the database server 130, the database client 100P submits queries to the database 135 without them passing through the security gateway 320. Thus, the security gateway 320 may not be aware of the attempts to access the decoy database object 140 by database client 100P.

In one embodiment, if an attempt to access the decoy database object 140 is deemed to likely be malicious by the security gateway 320, then the security gateway 320 blocks/denies the access to the decoy database object 140. Such inline blocking provides the advantage that it prevents the decoy database object 140 from being altered (e.g., modified or deleted) by malicious access attempts. This contrasts with conventional approaches for monitoring a decoy database object 140 (e.g., using database auditing approaches), which only detect the access after the decoy database object 140 has already been read from, modified, and/or deleted.

Figure 3B:
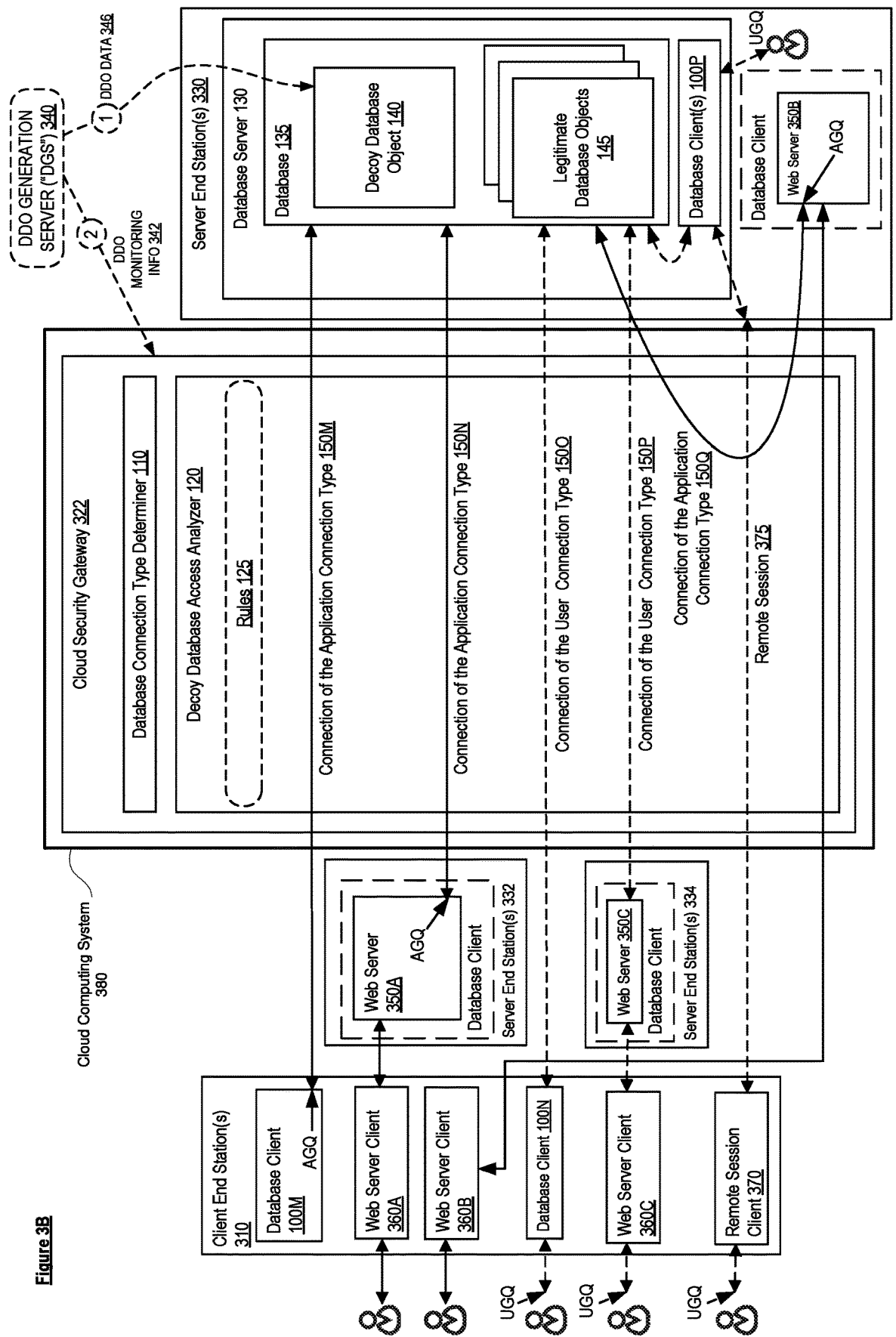
FIG. 3B is a block diagram illustrating a cloud security gateway deployment, according to some embodiments.

FIG. 3B is a block diagram illustrating a cloud security gateway deployment, according to some embodiments. In this deployment, the security gateway 320 is implemented by a cloud security gateway 322 in a cloud computing system 380. In this deployment, any traffic sent toward the server end station(s) 330 over connections 150 classified as being of the application connection type or the user connection type, including attempts to access decoy database object 140, pass through the cloud security gateway 322 and the decoy database access analyzer 120 of the cloud security gateway 322 (in conjunction with the database connection type determiner 110) can determine whether an attempt to access the decoy database object 140 is likely malicious based on the pre-configured rules 125.

Figure 4A:
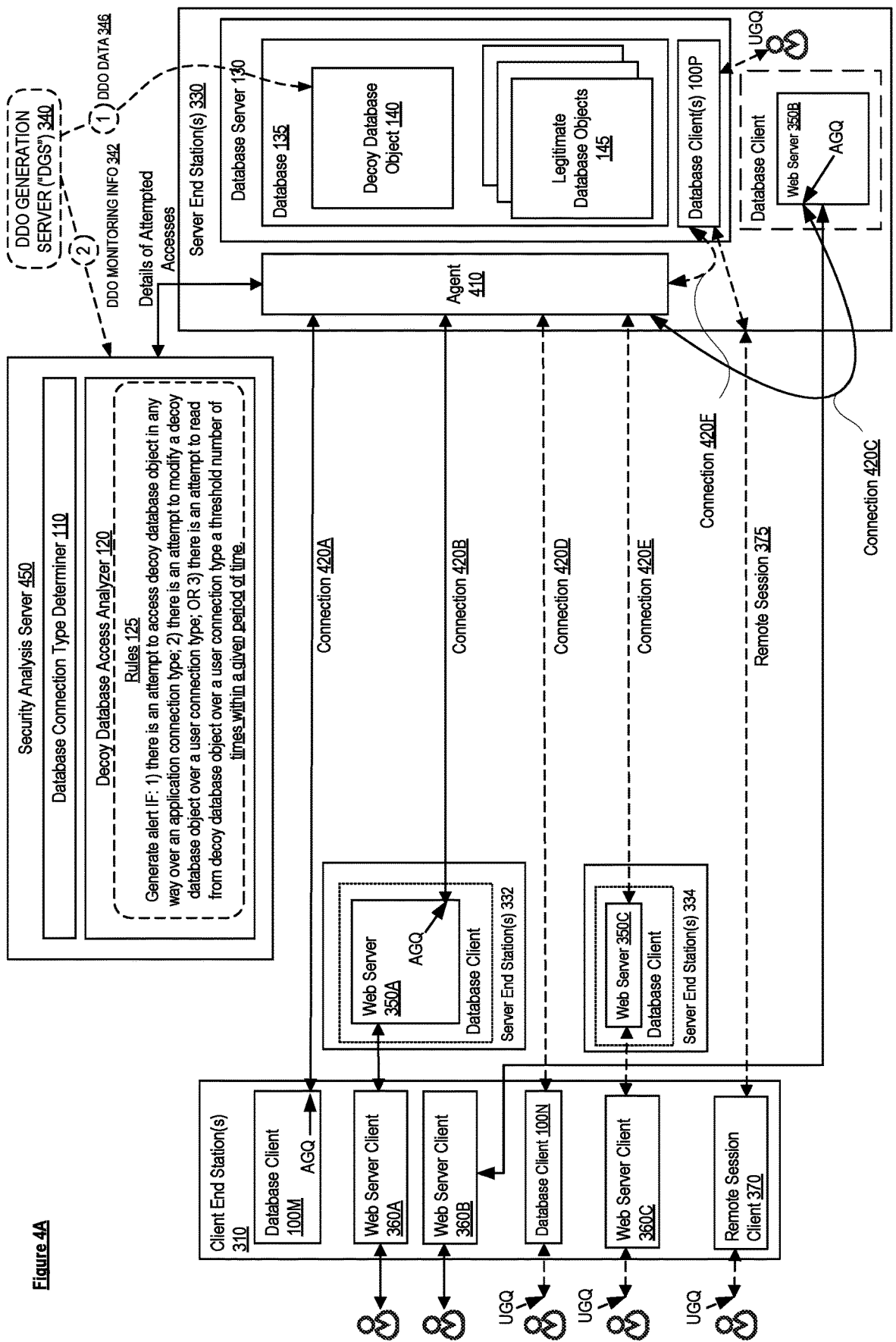
FIG. 4A is a block diagram illustrating an agent deployment, according to some embodiments.

FIG. 4A is a block diagram illustrating an agent deployment, according to some embodiments. In this deployment, a database agent 410 (sometimes referred to simply as "agent") is deployed in server end station(s) 330 to monitor accesses to the database 135. The agent 410 is a piece of software installed locally or close to the database 135 that is configured to monitor accesses to the database 135. Thus, access to the database 135 can be thought of as being "protected" by the agent 410, as most (or all) interactions with the database 135 will pass through the agent 410. Also, in this deployment, the database connection type determiner 110 and the decoy database access analyzer 120 are implemented in a security analysis server 450 that is communicatively coupled to the agent 410.

In some embodiments, the security analysis server 450 executes as part of a separate server end station or a network device, but in other embodiments, the security analysis server can operate as part of server end station(s) 330 (for example, as a software module), can be implemented in a cloud (e.g., as described later herein with regard to FIG. 4B), or can be implemented using another type of electronic device, and can be software, hardware, or a combination of both.

Similar to that shown and described above with reference to FIG. 3A, client end station(s) 310 may implement database client 100M, web server client 360A, web server client 360B, database client 100N, web server client 360C, and remote session client 370. Also, server end station(s) 332 implement web server 350A and server end station(s) 334 implement web server 350C. Also, server end station(s) 330 may implement database server 130 and web server 350B.

Similar to that shown and described above with reference to FIG. 3A, in one embodiment, the decoy database object generation server 340 may create the decoy database object 140 in the database 135 and populate the decoy database object 140 with data 346, as well as send the monitoring information (e.g., rules 125) for monitoring the decoy database object 140 to the security analysis server 450.

Each of the database clients may establish a connection to the database 135. For example, database client 100M establishes connection 420A, web server 350A establishes connection 420B, web server 350B establishes connection 420C, database client 100N establishes connection 420D, web server 350C establishes connection 420E, and database client 100P establishes connection 420F. Each of the database clients may submit queries to the database 135 over their respective connections.

Any attempts to access the database 135 are monitored by the agent 410 (e.g., the agent 410 may record the traffic between database clients and the database 135—the traffic can include external traffic (e.g., sent to/from the database 135 over a network) and/or local traffic (e.g., sent to/from the database 135 via inter-process communication (IPC)). The agent 410 sends information concerning the connections to the security analysis server 450 so that the database connection type determiner 110 can classify each of the connections as being of the application connection type or the user connection type. When the agent 410 detects that an attempt is being made to access the decoy database object 140, the agent 410 sends the details regarding the attempted access to the security analysis server 450. The decoy database access analyzer 120 may then determine, based on the connection type determined by the database connection type determiner 110, whether the access is likely malicious based on a pre-configured set of rules 125 and cause an alert to be generated if the attempted access is deemed to be likely malicious. As previously described, according to the rules 125 configured in the decoy database access analyzer 120, the decoy database access analyzer 120 causes an alert to be generated if there is an attempt to access the decoy database object 140 in any way over a connection 150 of the application connection type. In this example, the database connection type determiner 110 classifies connections 420A, 420B, and 420C as being of the application connection type. Thus, the decoy database access analyzer 120 causes an alert to be generated if it detects that an attempt to access the decoy database object 140 is made in any way over any one of connections 420A, 420B and 420C. Also, according to the rules, the decoy database access analyzer 120 generates an alert if there is an attempt to modify a decoy database object 140 over a connection 150 of the user connection type or if there is an attempt to read from the decoy database object 140 over a connection 150 of the user connection type a threshold number of times within a given period of time. In this example, the database connection type determiner 110 classifies connections 420D, 420E, and 420F as being of the user connection type. Thus, the decoy database access analyzer 120 causes an alert to be generated if it detects that an attempt to modify the decoy database object 140 is made over any one of connections 420D, 420E, and 420F or if it detects that an attempt to read from the decoy database object 140 is made over any one of connections 420D, 420E, and 420F a threshold number of times within a given period of time.

It should be noted that attempts to access the database 135 made by database client 100P also pass through the agent 410. Thus, malicious attempts to access the decoy database object 140 made via database client 100P can also be detected. Thus, the agent deployment of FIG. 4A may provide an advantage over the security gateway deployment in that that it can detect likely malicious attempts to access the decoy database object 140 caused by insiders (e.g., that have remote or direct access to a local database client 100P).

Similar to one embodiment of the security gateway 320 previously described, in one embodiment, if an attempt to access the decoy database object 140 is deemed to likely be malicious, then the agent 410 blocks/denies the access to the decoy database object 140.

Figure 4B:
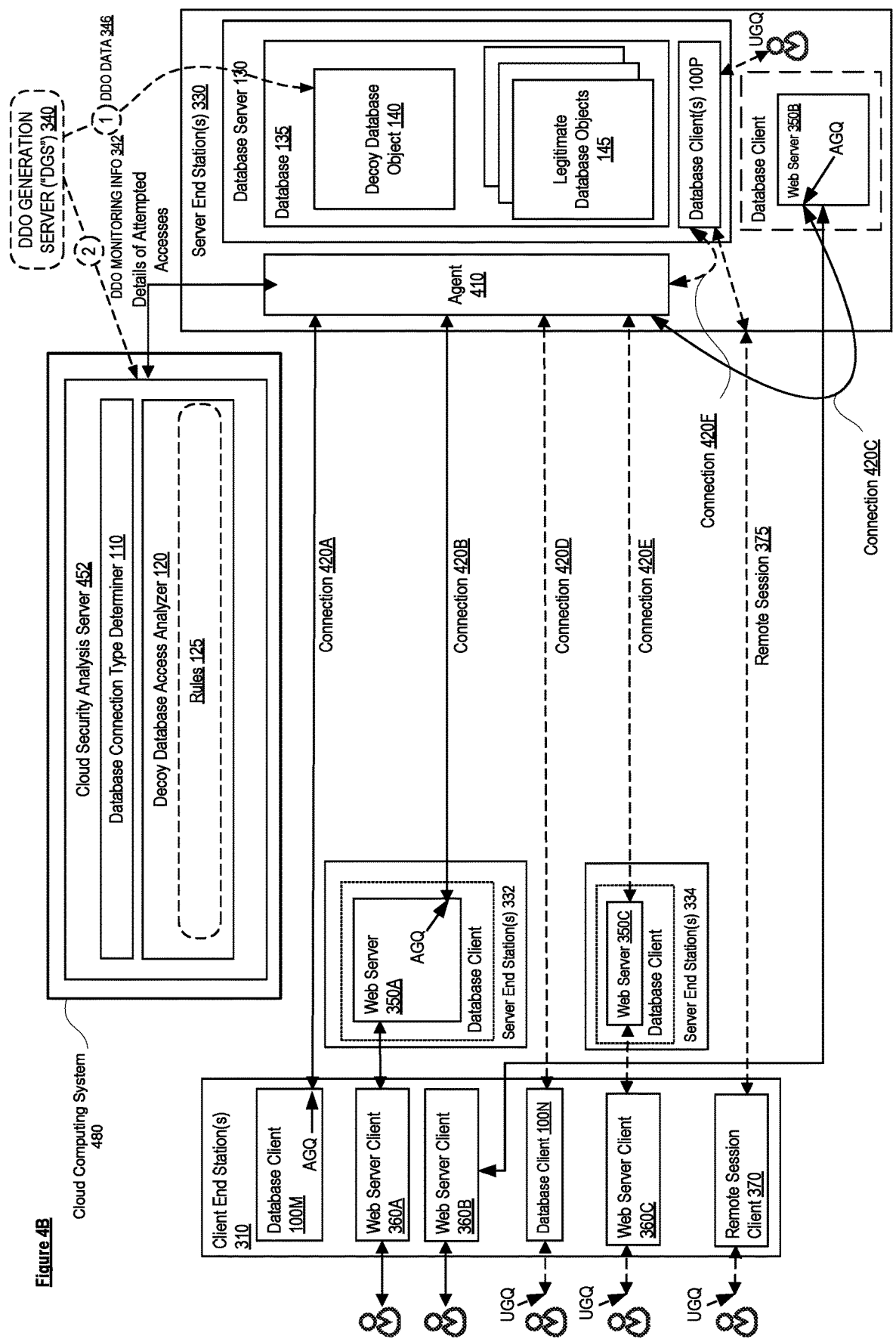
FIG. 4B is a block diagram illustrating a cloud security analysis server deployment, according to some embodiments.

FIG. 4B is a block diagram illustrating a cloud security analysis server deployment, according to some embodiments. In this deployment, the security analysis server 450 is implemented by a cloud security analysis server 452 in a cloud computing system 480. In this deployment, the agent 410 sends details regarding attempts to access the decoy database object 140 to the cloud security analysis server 452 and the decoy database access analyzer 120 of the cloud security analysis server 452 (in conjunction with the database connection type determiner 110) can determine whether an attempt to access the decoy database object 140 is likely malicious based on the pre-configured rules 125.

Regardless of the manner of deployment (see FIGS. 3A-4B), the decoy database object 140 is generated, in some embodiments, using one or more techniques to increase the chances of luring an attacker. According to a first technique, the decoy database object 140 is named in a way that will make it more likely that an attacker will attempt to access it. As a first example, a decoy database object 140 can be named such that it will appear first (or among the first) in a list of database objects. For a list in alphabetically ascending order, this may be carried out by naming a decoy database object 140 such that it begins with a character such as an exclamation mark, quotation mark, or other American Standard Code for Information Interchange (ASCII) character with a low ASCII code value that is acceptable by the database vendor. For a list in alphabetically descending order, this may be carried out by naming a decoy database object 140 such that it will appear first (or among the first) in a list of database objects (e.g., staring the name with one or more "~"—since this character has a high ASCII code value).

As a second example, the decoy database object 140 may be named such that it includes certain high-value keywords that are known to be searched by attackers. Some attackers do not iterate through the entire list of database objects, but will search for database objects that appear to have the most valuable data. For example, an attacker may attempt to filter through the database objects by searching for objects that have the keyword "password," "pass," "pw," "email," "creditcard," "user," or the like in their names A decoy database object 140 can be named to include one or more keywords (such as those mentioned above) so that it will appear when an attacker searches for database objects by keyword. The following names make use of both examples provided for the first technique: "!!!!____archive_credit_cards" and "~~~~____archive_passwords."

According to a second technique to increase the chances of luring an attacker, the decoy database object 140 may be populated with alluring, but fake data. If the decoy database object 140 is populated with obviously fake data, then the attacker may recognize this and avoid accessing the decoy database object 140. At the same time, it is typically inadvisable to populate the decoy database object 140 with real data (which may include sensitive information). In one embodiment, in order to increase the chances of luring an attacker, the decoy database object 140 is populated with data from a legitimate database object 145 that has been pseudonymized (in order to make the data appear real, while avoiding exposure of real data). Data pseudonymization (also referred to as data de-identification, anonymization, or obfuscation) is a method of protecting sensitive data by replacing original (also referred to as actual or real) data with fictitious but realistic looking data. Unlike encryption and tokenization, data pseudonymization is a non-reversible process where data goes through a one-way transformation. Encryption is a reversible process that scrambles data at rest, but then unscrambles the data once it is accessed. Data pseudonymization may be applied to the original data in one, multiple, or all fields of original (also referred to as actual or real) record(s). Additionally or alternatively, the method of data pseudonymization may vary by field, record and/or database object, or not at all. Several methods can be used to pseudonymize data including, but not limited to, character/number substitution, character shuffling, the use of algorithms to generate random data that has the same properties as the original data, and/or the use of pre-generated fictitious data pulled from a repository. For example, a credit card number that has a 16-digit format may be as follows: "1234-5678-9123-4567." A data pseudonymization method may change the numbers, but keep the same 16-digit format to produce "9076-5432-1987-6543. As another example, the data in the fields of the following database record "Name: John Doe; Age: 33; Gender: Male" can be replaced with "Name: Jane Smith; Age 64; Gender: Female" from a repository of pre-generated fictitious data.

According to a third technique to increase the chances of luring an attacker, the decoy database object 140 is structured identically or similarly to a legitimate database object 145 (e.g., for a relational database, the decoy database object 140 may be structured to have the same columns as a legitimate database object 145). According to a fourth technique to increase the chances of luring an attacker, the decoy database object 140 is populated such that it has a size similar to that of a legitimate database object 145. This may be useful in cases where the attacker filters out smaller-sized database objects.

As indicated above, different embodiments may use one or more of these four techniques, as well as optionally other techniques, on a given decoy database object 140 to increase the chances of luring an attacker.

Regardless of the manner of deployment (see FIGS. 3A-4B), an enterprise database environment may have a heterogeneous database environment (an environment that includes database from various vendors). Databases from different vendors may have a different query language/syntax for performing database operations on them. In order to create decoy database objects 140 in such a heterogenous database environment, a user/administrator typically has to generate alluring data and prepare separate commands to create a decoy database object for each vendor type. Also, the user/administrator typically has to manually prepare the rules for alerting/blocking likely malicious access attempts to these decoy database objects 140. This process can inefficient because the user/administrator has to be aware of the different vendor types and the query language/syntax for each of the vendor types; in fact, this inefficiency can cause user/administrator to forgo the use of decoy database objects 140. Embodiments such as those described below may provide automatic and vendor-agnostic creation of decoy database objects 140 and monitoring rules 125.

Figure 5:
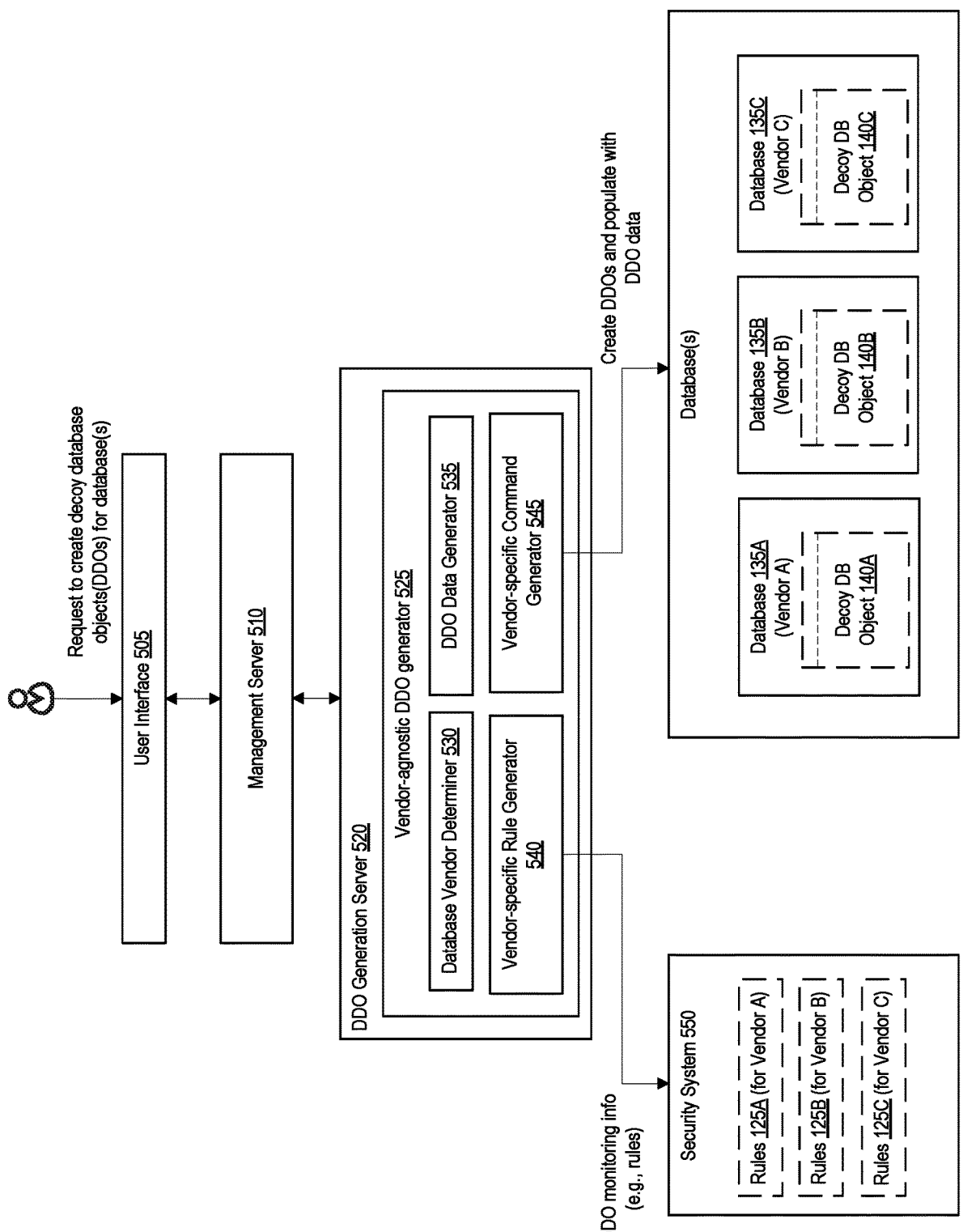
FIG. 5 is a block diagram illustrating a system for vendor-agnostic creation of decoy database objects and monitoring rules, according to some embodiments.

FIG. 5 is a block diagram illustrating a system for vendor-agnostic creation of decoy database objects and monitoring rules, according to some embodiments.

The system includes a user interface 505, a management server 510, a decoy database object (DDO) generation server 520 (e.g., which could be an embodiment of DDO generation server 340 shown in FIGS. 3A-4B), a security system 550 (e.g., which could include a security gateway 320 or a security analysis server 450), and databases 135A, 135B, and 135C, each from different vendors. Database 135A is from vendor A, database 135B is from vendor B, and database 135C is from vendor C. In one embodiment, the management server 510 provides a user interface 505 that allows a user to request vendor-agnostic creation of decoy database objects 140A-C and monitoring rules 125. In one embodiment, the user interface 505 may be a GUI provided as part of a management application or a management web page. In one embodiment, the user interface 505 allows a user to indicate the databases 135 for which a decoy database object 140 should be created and/or allows a user to indicate that a decoy database object 140 be created for every database (since the management server may have knowledge of all of the databases deployed in the system/enterprise). For example, the user may interact with the user interface 505 to request that decoy database objects 140A-C be created for databases 135A, 135B, and 135C. The management server 510 receives the request and interacts with the DDO generation server 520 to satisfy the request. In the illustrated embodiment, the DDO generation server 520 includes a vendor-agnostic DDO generator 525 that includes a database vendor determiner 530, a DDO data generator 535, a vendor-specific rule generator 540, and a vendor-specific command generator 545. The database vendor determiner 530 determines the vendor type of the databases 135 in which decoy database objects 140 are to be created. In this example, the database vendor determiner 530 determines that database 135A is from vendor A, database 135B is from vendor B, and database 135C is from vendor C. The DDO data generator 535 generates names for and/or data to populate the respective decoy database objects 140 as discussed above. The vendor-specific command generator 545 generates the vendor-specific commands for creating a decoy database object 140 in each of the respective databases 135. In one embodiment, the vendor-specific command generator 545 generates a command for a specific vendor based on looking up the command syntax for that vendor in a database or other data storage. In this example, the vendor-specific command generator 545 generates the vendor-specific commands for creating a decoy database object 140 in database 135A (vendor A), database 135B (vendor B), and database 135C (vendor B), respectively, and submits these commands (e.g., which could be an embodiment of DDO data 346) to the respective databases 135. This results in decoy database object 140A, decoy database object 140B, and decoy database object 140C being created in database 135A, database 135B, and database 135C, respectively. The vendor-specific rule generator 540 generates vendor-specific monitoring information for monitoring the decoy database objects 140 (e.g., monitoring rules) and configures the security system 550 with the generated monitoring information. In one embodiment, the security system 550 includes a security gateway 320 or a security analysis server 450. In this example, the vendor-specific rule generator 540 generates rules 125A, rules 125B, and rules 125C for monitoring decoy database object 140A, decoy database object 140B, and decoy database object 140C, respectively, and causes the installation of these rules (e.g., which could be an embodiment of DDO monitoring information 342) in the security system 550. Additionally or alternatively, embodiments may implement an abstraction layer that allows users to create decoy database objects 140 for databases 135 from different vendors using the same user interface 505 using just the address of the database server, the port number, and the credentials (e.g., username/password) (and thus, without having to know the vendor-specific particulars of how to connect to a database and without having to know the vendor-specific syntax for creating database objects).

Figure 6:
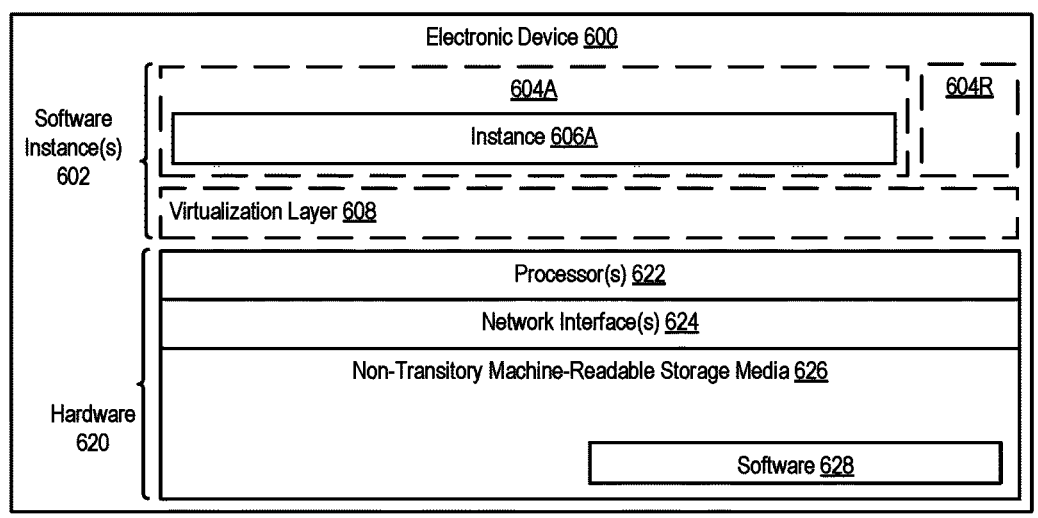
FIG. 6 is a block diagram illustrating an electronic device, according to some embodiments.

FIG. 6 is a block diagram illustrating an electronic device, according to some embodiments. FIG. 6 includes hardware 620 comprising a set of one or more processor(s) 622, a set of one or more network interfaces 624 (wireless and/or wired), and non-transitory machine-readable storage media 626 having stored therein software 628 (which includes instructions executable by the set of one or more processor(s) 622). Software 628 can include code, which when executed by hardware 620, causes the electronic device 600 to perform operations of one or more embodiments described herein (e.g., the operations of security gateway 320, security analysis server 450, and/or agent 410).

In electronic devices that use compute virtualization, the set of one or more processor(s) 622 typically execute software to instantiate a virtualization layer 608 and software container(s) 604A-R (e.g., with operating system-level virtualization, the virtualization layer 608 represents the kernel of an operating system (or a shim executing on a base operating system) that allows for the creation of multiple software containers 604A-R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 628 (illustrated as instance 606A) is executed within the software container 604A on the virtualization layer 608. In electronic devices where compute virtualization is not used, the instance 606A on top of a host operating system is executed on the "bare metal" electronic device 600. The instantiation of the instance 606A, as well as the virtualization layer 608 and software containers 604A-R if implemented, are collectively referred to as software instance(s) 602.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory computer-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by a security system implemented by one or more electronic devices for detecting malicious attempts to access a decoy database object in a database, wherein the database includes database objects, including the decoy database object, accessible by clients of the database called database clients, the method comprising:
   detecting access to a decoy database object of the database is being attempted by a database client over a connection to the database, wherein the decoy database object is a database object that is created for the purpose of deceiving an attacker as opposed to being a legitimate database object;
   determining that the connection is of an application connection type as opposed to a user connection type, wherein the application connection type is a type of connection over which queries generated by application code of a database client are submitted, and wherein the user connection type is a type of connection over which ad-hoc queries generated by a user interacting with a database client are submitted;
   responsive to the determination that the connection is of the application connection type, causing an alert to be generated;
   detecting a second access and a third access to the decoy database object of the database is being attempted by a database client over a second connection to the database;
   determining that the second connection is of the user connection type as opposed to the application connection type;
   responsive to the determination that the second connection is of the user connection type and that with the second access, a threshold number of accesses to read from the decoy database object will not have been made within a given period of time, allowing the second access; and responsive to a determination that with the third access, the threshold number of accesses to read from the decoy database object will have been made within the given period of time, causing a second alert to be generated.

2. The method of claim 1, further comprising:
detecting a fourth access to the decoy database object of the database is being attempted by a database client over the second connection to the database; and
responsive to a determination that the fourth access attempts to modify the decoy database object, causing a third alert to be generated.

3. The method of claim 1, wherein the database client is a web server.

4. The method of claim 1, wherein determining that the connection is of the application connection type is based on analyzing one or more of: a name of the database client, a driver being used by the database client to connect to the database, queries submitted over the connection, an amount of data sent over the connection.

5. The method of claim 1, wherein the security system includes a security gateway.

6. The method of claim 1, wherein the security system includes a security analysis server and an agent of the database.

7. The method of claim 1, wherein the database is a production database.

8. The method of claim 1, wherein the alert causes the attempt by the database client to access the decoy database object to be blocked.

9. A set of one or more non-transitory computer readable storage media storing instructions which, when executed by one or more processors of one or more computing devices, cause the one or more computing devices to perform operations for detecting malicious attempts to access a decoy database object in a database, wherein the database includes database objects, including the decoy database object, accessible by clients of the database called database clients, the operations comprising:
detecting access to a decoy database object of the database is being attempted by a database client over a connection to the database, wherein the decoy database object is a database object that is created for the purpose of deceiving an attacker as opposed to being a legitimate database object;
determining that the connection is of an application connection type as opposed to a user connection type, wherein the application connection type is a type of connection over which queries generated by application code of a database client are submitted, and wherein the user connection type is a type of connection over which ad-hoc queries generated by a user interacting with a database client are submitted;
responsive to the determination that the connection is of the application connection type, causing an alert to be generated;
detecting a second access and a third access to the decoy database object of the database is being attempted by a database client over a second connection to the database;
determining that the second connection is of the user connection type as opposed to the application connection type;

responsive to the determination that the second connection is of the user connection type and that with the second access, a threshold number of accesses to read from the decoy database object will not have been made within a given period of time, allowing the second access; and responsive to a determination that with the third access, the threshold number of accesses to read from the decoy database object will have been made within the given period of time, causing a second alert to be generated.

10. The set of one or more non-transitory computer readable storage media of claim 9, wherein the operations further comprise:
detecting a fourth access to the decoy database object of the database is being attempted by a database client over the second connection to the database; and
responsive to a determination that the fourth access attempts to modify the decoy database object, causing a third alert to be generated.

11. The set of one or more non-transitory computer readable storage media of claim 9, wherein the database client is a web server.

12. The set of one or more non-transitory computer readable storage media of claim 9, wherein determining that the connection is of the application connection type is based on analyzing one or more of: a name of the database client, a driver being used by the database client to connect to the database, queries submitted over the connection, an amount of data sent over the connection.

13. A computing device configured to detect malicious attempts to access a decoy database object in a database, wherein the database includes database objects, including the decoy database object, accessible by clients of the database called database clients, the computing device comprising:
one or more processors; and
a non-transitory machine-readable storage medium having instructions stored therein,
which when executed by the one or more processors, causes the computing device to:
detect access to a decoy database object of the database is being attempted by a database client over a connection to the database, wherein the decoy database object is a database object that is created for the purpose of deceiving an attacker as opposed to being a legitimate database object,
determine that the connection is of an application connection type as opposed to a user connection type, wherein the application connection type is a type of connection over which queries generated by application code of a database client are submitted, and wherein the user connection type is a type of connection over which ad-hoc queries generated by a user interacting with a database client are submitted,
responsive to the determination that the connection is of the application connection type, cause an alert to be generated,
detect a second access and a third access to the decoy database object of the database is being attempted by a database client over a second connection to the database,
determine that the second connection is of the user connection type as opposed to the application connection type, responsive to the determination that the second connection is of the user connection type and that with the second access, a threshold number of accesses to read from the decoy database object will not have been made within a given period of time, allow the second access, and responsive to a determination that with the third access, the threshold number of accesses to read from the decoy database object will have been made within the given period of time, cause a second alert to be generated.

14. The computing device of claim 13, wherein the instructions, when executed by the one or more processors, further causes the computing device to:

detect a fourth access to the decoy database object of the database is being attempted by a database client over the second connection to the database, determine that the second connection is of the user connection type as opposed to the application connection type, and responsive to a determination that the fourth access attempts to modify the decoy database object, cause a third alert to be generated.

15. The computing device of claim 13, wherein the database client is a web server.

16. The computing device of claim 13, wherein the determination that the connection is of the application connection type is based on analyzing one or more of: a name of the database client, a driver being used by the database client to connect to the database, queries submitted over the connection, an amount of data sent over the connection.

17. The computing device of claim 13, wherein the computing device implements a security gateway or a security analysis server.

* * * * *